(12) United States Patent
Shen (10) Patent No.: US 9,890,563 B2
(45) Date of Patent: Feb. 13, 2018

(54) CENTRAL ACCESS CONTROL SYSTEM

(71) Applicant: I-Ting Shen, Tainan (TW)

(72) Inventor: I-Ting Shen, Tainan (TW)

(*) Notice: Subject to any disclaimer, the term of this patent is extended or adjusted under 35 U.S.C. 154(b) by 0 days.

(21) Appl. No.: 15/194,627

(22) Filed: Jun. 28, 2016

(65) Prior Publication Data
US 2017/0335602 A1 Nov. 23, 2017

(30) Foreign Application Priority Data

May 20, 2016 (TW) .............................. 105115653 A (51) Int. Cl.
| | | |
|---|---|---|
| *G05B 23/00* | (2006.01) | |
| *E05B 47/00* | (2006.01) | |
| *E05B 17/10* | (2006.01) | |
| *E05B 41/00* | (2006.01) | |

(52) U.S. Cl.
CPC .......... *E05B 47/0001* (2013.01); *E05B 17/10* (2013.01); *E05B 41/00* (2013.01); *E05B 2047/0084* (2013.01); *E05B 2047/0095* (2013.01)

(58) Field of Classification Search
CPC ..................... G07C 9/00666; G07C 9/00309
USPC ........................................................ 340/5.5
See application file for complete search history.

(56) References Cited

U.S. PATENT DOCUMENTS

| | | | | |
|---|---|---|---|---|
| 2002/0180582 A1* | 12/2002 | Nielsen | .............. | G07C 9/00103 340/5.6 |
| 2007/0204665 A1* | 9/2007 | Lie-Nielsen | ........ | E05B 47/0676 70/472 |
| 2008/0066506 A1* | 3/2008 | Carbajal | ................. | A47F 3/043 70/267 |
| 2010/0201536 A1* | 8/2010 | Robertson | .......... | G07C 9/00904 340/686.6 |

* cited by examiner

*Primary Examiner* — Vernal Brown
(74) *Attorney, Agent, or Firm* — Alan D. Kamrath; Kamrath IP Lawfirm, P.A.

(57) ABSTRACT

A central access control system (10) includes a plurality of doors (44), a plurality of door locks (20) respectively mounted to the doors (44), a control device (33) connected to the door locks (20), and an unlocking device (40) for setting the control device (33) to be in an enabling state or a forbidding state. When the control device (33) is set to be in the forbidding state, the control device (33) outputs a forbidding signal to all of the door locks (20) to set the door locks (20) in a locking state. When the control device (33) is set to be in the enabling mode, the control module (33) outputs an enabling signal to all of the door locks (20), and a locking state or an unlocked state of a locking mechanism (24) of each door lock (20) remains unchanged.

4 Claims, 7 Drawing Sheets

CENTRAL ACCESS CONTROL SYSTEM

BACKGROUND OF THE INVENTION

The present invention relates to a central access control system and, more particularly, to a central access control system using a single control device to rapidly control locking of a plurality of door locks while permitting each door lock to be locked or unlocked individually.

There are various types of door locks available in the market, including mechanical locks and electronic locks incorporating motors, electromagnetic valves, and electronic parts. These door locks can be locked or unlocked separately. When the door locks are operated to be in a locking state while the door is closed, the door cannot move from the closed position to the open position, achieving an antiburglar function.

When the door locks are used in a unit having many rooms, there is no guarantee that the door locks can reliably prevent burglars from breaking into the rooms. For example, in a school having a plurality of classrooms each having its own door and its own door lock, it is difficult to make sure the door of every classroom is locked after class. Furthermore, it is impossible to lock the door of every classroom in the school immediately after a security event occurs. In another example of a large company having a plurality of offices each having a door and a door lock, it is difficult to lock all of the offices at the same time. As a result, the school or the large company has to hire a person to check whether every door is locked.

BRIEF SUMMARY OF THE INVENTION

In a first aspect, a central access control system includes a plurality of doors. Each of the plurality of doors is movable between a closed position and an open position. A plurality of door locks is respectively mounted to the plurality of doors. Each of the plurality of door locks includes a latch driving device and a latch actuatable by the latch driving device to move between a latching position and an unlatching position. Each of the plurality of door locks further includes a locking mechanism for prohibiting operation of the latch driving device, a first manual setting device, an electric setting device, and a door lock control unit electrically connected to the electric setting device. The first manual setting device and the electric setting device are configured to set the locking mechanism into a locking state or an unlocked state. A control device includes a control module electrically connected to the door lock control units of the plurality of door locks. An unlocking device is configured to match with the control module of the control device to obtain control and is configured to set the control device to be in an enabling state or a forbidding state.

When one of the plurality of doors is in the closed position and the latch of a corresponding one of the plurality of door locks is in the latching position, the one of the plurality of doors is not permitted to move from the closed position to the open position.

When one of the plurality of doors is in the closed position and the latch of a corresponding one of the plurality of door locks is in the unlatching position, the one of the plurality of doors is permitted to move from the closed position to the open position.

When the locking mechanism of one of the plurality of door locks is set by the first manual setting device or the electric setting device to be in the locking state, the latch driving device of the one of the plurality of door locks is not permitted to drive the latch of the one of the plurality of door locks from the latching position to the unlatching position.

When the locking mechanism of one of the plurality of door locks is set by the first manual setting device or the electric setting device to be in the unlocked state, the latch driving device of the one of the plurality of door locks is permitted to drive the latch of the one of the plurality of door locks from the latching position to the unlatching position.

When the control device is set by the unlocking device to be in the enabling state, the control module outputs an enabling signal to the door lock control units of the plurality of door locks, the electric setting devices of the plurality of door locks are not operative, and the locking mechanism of each of the plurality of door locks in the unlocking state or the locked state remains unchanged.

When the control device is set by the unlocking device to be in the forbidding state, the control module outputs a forbidding signal to the door lock control units of the plurality of door locks, and the electric setting devices of the plurality of door locks set the locking mechanisms of the plurality of door locks to be in the locked states.

Each of the plurality of door locks can further include an indicating device electrically connected to one of the door lock control units and mounted to an inner side of one of the plurality of doors. Each indicating device generates at least one of light and sound to indicate the control device is in the enabling state or the forbidding state.

The first manual setting device of each of the plurality of door locks can be mounted to an outer side of one of the plurality of doors. Each of the plurality of door locks can further include a second manual setting device mounted to the inner side of one of the plurality of doors. The second manual setting device is configured to set the locking mechanism to be in the locking state or the unlocked state. Each of the plurality of door locks further includes a first handle mounted to the outer side of one of the plurality of doors and operatively connected to the latch driving device and a second handle mounted to the inner side of one of the plurality of doors and operatively connected to the latch driving device. When the locking mechanism is set in the locking state, the second manual setting device is permitted to set the locking mechanism to be in the unlocked state, permitting use of the first handle and the second handle to actuate the latch driving device to drive the latch from the latching position to the unlatching position.

The control device can further include a connector electrically connected to the control module and a main memory electrically connected to the control module. The main memory is configured to store a first identification information. When the unlocking device is electrically connected to the connector, the control module reads a second identification information in the unlocking device. The control device is set to be in the enabling state when the first identification information matches with the second identification information. The control device is set to be in the forbidding state when the first identification information does not match with the second identification information. When the unlocking device is not electrically connected to the connector, the control device is set to be in the forbidding state.

Each of the plurality of door locks can further include a memory electrically connected to the door lock control unit and a reading device electrically connected to the door lock control unit. A comparison identification information is stored in the memory. An enabling identification information is stored in the unlocking device. When the control device is set to be in the forbidding state and the unlocking device is located adjacent to one of the plurality of door locks, the reading device of the one of the plurality of door locks reads the enabling identification information stored in the unlocking device. When the comparison identification information in the memory matches with the enabling identification information in the unlocking device, the door lock control unit actuates the electric setting device to set the locking mechanism to be in the unlocked state. When the comparison identification information in the memory does not match with the enabling identification information in the unlocking device, the door lock control unit actuates the electric setting device to set the locking mechanism to be in the locking state.

In a second aspect, a central access control system includes a plurality of doors. Each of the plurality of doors is movable between a closed position and an open position. A plurality of door locks is respectively mounted to the plurality of doors. Each of the plurality of door locks includes a latch driving device and a latch actuatable by the latch driving device to move between a latching position and an unlatching position. Each of the plurality of door locks further includes a locking mechanism for prohibiting operation of the latch driving device, a first manual setting device, an electric setting device, a door lock control unit electrically connected to the electric setting device, and a first wireless transmission module electrically connected to the door lock control unit. The first manual setting device and the electric setting device are configured to set the locking mechanism into a locking state or an unlocked state. A control device includes a control module electrically connected to the door lock control units of the plurality of door locks and a second wireless transmission module electrically connected to the control module and the first wireless transmission modules of the plurality of door locks. An unlocking device is configured to match with the control module of the control device to obtain control and is configured to set the control device to be in an enabling state or a forbidding state.

When one of the plurality of doors is in the closed position and the latch of a corresponding one of the plurality of door locks is in the latching position, the one of the plurality of doors is not permitted to move from the closed position to the open position.

When one of the plurality of doors is in the closed position and the latch of a corresponding one of the plurality of door locks is in the unlatching position, the one of the plurality of doors is permitted to move from the closed position to the open position.

When the locking mechanism of one of the plurality of door locks is set by the first manual setting device or the electric setting device to be in the locking state, the latch driving device of the one of the plurality of door locks is not permitted to drive the latch of the one of the plurality of door locks from the latching position to the unlatching position.

When the locking mechanism of one of the plurality of door locks is set by the first manual setting device or the electric setting device to be in the unlocked state, the latch driving device of the one of the plurality of door locks is permitted to drive the latch of the one of the plurality of door locks from the latching position to the unlatching position.

When the control device is set by the unlocking device to be in the enabling state, the control module outputs an enabling signal to the door lock control units of the plurality of door locks, the electric setting devices of the plurality of door locks are not operative, and the locking mechanism of each of the plurality of door locks in the unlocking state or the locked state remains unchanged.

When the control device is set by the unlocking device to be in the forbidding state, the control module outputs a forbidding signal to the door lock control units of the plurality of door locks, and the electric setting devices of the plurality of door locks set the locking mechanisms of the plurality of door locks to be in the locked states.

Each of the plurality of door locks can further include an indicating device electrically connected to one of the door lock control units and mounted to an inner side of one of the plurality of doors. Each indicating device generates at least one of light and sound to indicate the control device is in the enabling state or the forbidding state.

The first manual setting device of each of the plurality of door locks can be mounted to an outer side of one of the plurality of doors. Each of the plurality of door locks can further include a second manual setting device mounted to the inner side of one of the plurality of doors. The second manual setting device is configured to set the locking mechanism to be in the locking state or the unlocked state. Each of the plurality of door locks can further include a first handle mounted to the outer side of one of the plurality of doors and operatively connected to the latch driving device and a second handle mounted to the inner side of one of the plurality of doors and operatively connected to the latch driving device. When the locking mechanism is set in the locking state, the second manual setting device is permitted to set the locking mechanism to be in the unlocked state, permitting use of the first handle and the second handle to actuate the latch driving device to drive the latch from the latching position to the unlatching position.

The control device can further include a third wireless transmission module electrically connected to the control module and a main memory electrically connected to the control module. The main memory is configured to store a first identification information. When the unlocking device is located in a communication range of the third wireless transmission module, the control module reads a second identification information in the unlocking device. The control device is set to be in the enabling state when the first identification information matches with the second identification information. The control device is set to be in the forbidding state when the first identification information does not match with the second identification information. When the unlocking device is not in the communication range of the third wireless transmission module, the control device is set to be in the forbidding state.

Each of the plurality of door locks can further include a memory electrically connected to the door lock control unit and a reading device electrically connected to the door lock control unit. A comparison identification information is stored in the memory. An enabling identification information is stored in the unlocking device. When the control device is set to be in the forbidding state and the unlocking device is located adjacent to one of the plurality of door locks, the reading device of the one of the plurality of door locks reads the enabling identification information stored in the unlocking device. When the comparison identification information in the memory matches with the enabling identification information in the unlocking device, the door lock control unit actuates the electric setting device to set the locking mechanism to be in the unlocked state. When the comparison identification information in the memory does not match with the enabling identification information in the unlocking device, the door lock control unit actuates the electric setting device to set the locking mechanism to be in the locking state.

Each of the plurality of door locks can further include a memory electrically connected to the door lock control unit and a reading device electrically connected to the door lock control unit. A comparison identification information is stored in the memory. Each of the plurality of door locks includes a hardware identification information stored in the memory. The hardware identification information of the plurality of door locks is stored in the unlocking device. A management program is installed in the unlocking device and is executable to operate the control device. The control device further includes a third wireless transmission module electrically connected to the control module and a main memory electrically connected to the control module. The main memory is configured to store a first identification information and the hardware identification information of the plurality of door locks.

The control device is set to be in the enabling state when the first identification information matches with a second identification information stored in the unlocking device, and the unlocking device is permitted to set the control device to be in the enabling state or the forbidding state.

The control device is set to be in the forbidding state when the first identification information does not match with the second identification information, and the unlocking device is permitted to operate the control device.

When the unlocking device is permitted to set the control device, the unlocking device is permitted to select one or more of the plurality of door locks, and a specified forbidding signal is sent to the plurality of door locks by the control device. The specified forbidding signal contains the hardware identification information of the selected one or more of the plurality of door locks. Each of the plurality of door locks receiving the specified forbidding signal compares the hardware identification information stored therein with the hardware identification information of the selected one or more of the plurality of door locks and executes the specified forbidding signal to set the locking mechanism thereof to be in the locking state if the hardware identification information stored therein matches with the hardware identification information of the selected one or more of the plurality of door locks, or does not execute the specified forbidding signal and retains the locking state or the unlocked state of the locking mechanism thereof when the hardware identification information stored therein does not match with the hardware identification information of the selected one or more of the plurality of door locks.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "inner", "outer", "side", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE INVENTION

Figure 1:
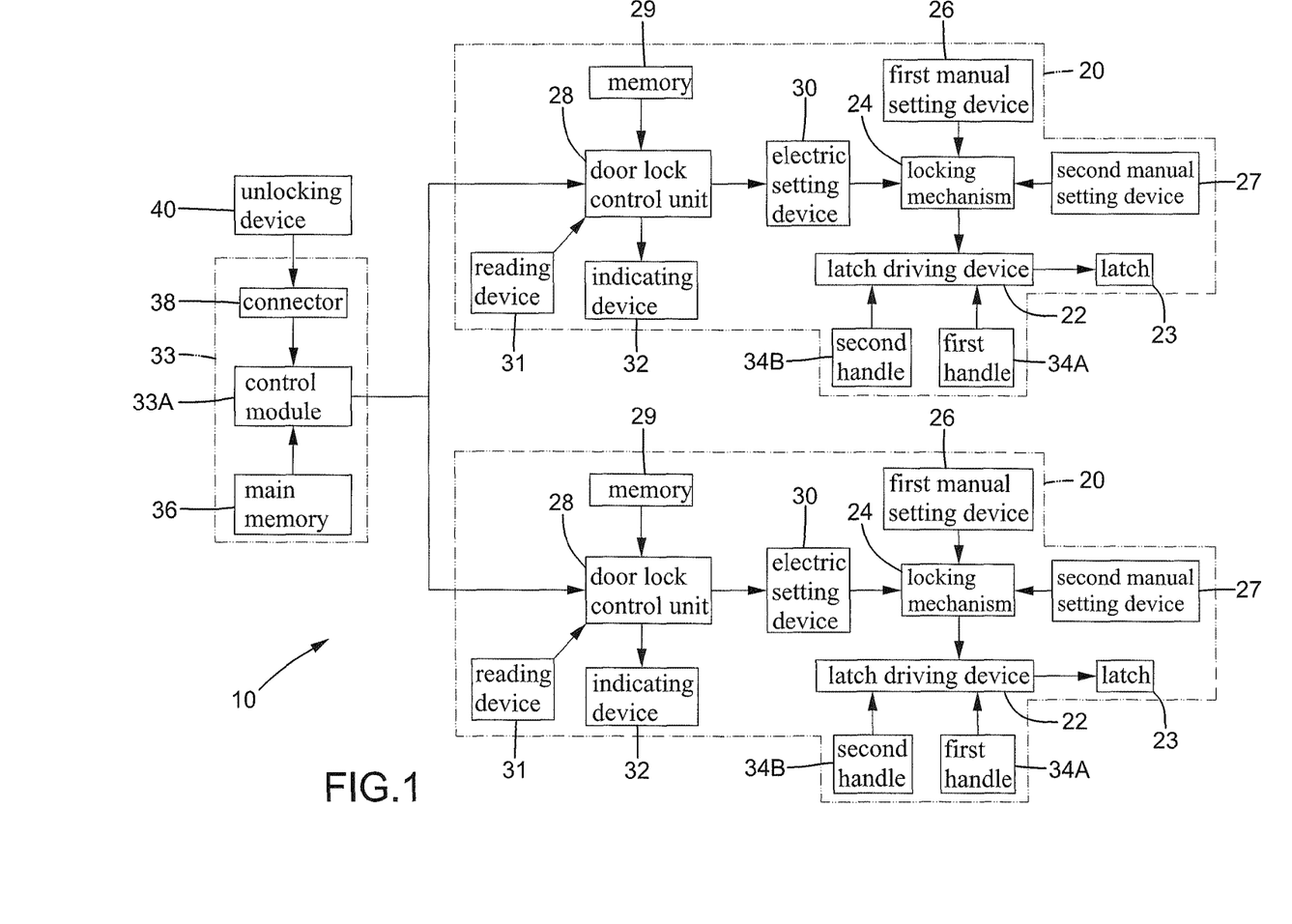
FIG. 1 is a diagrammatic block diagram of a central access control system of a first embodiment according to the present invention.
Figure 1A:
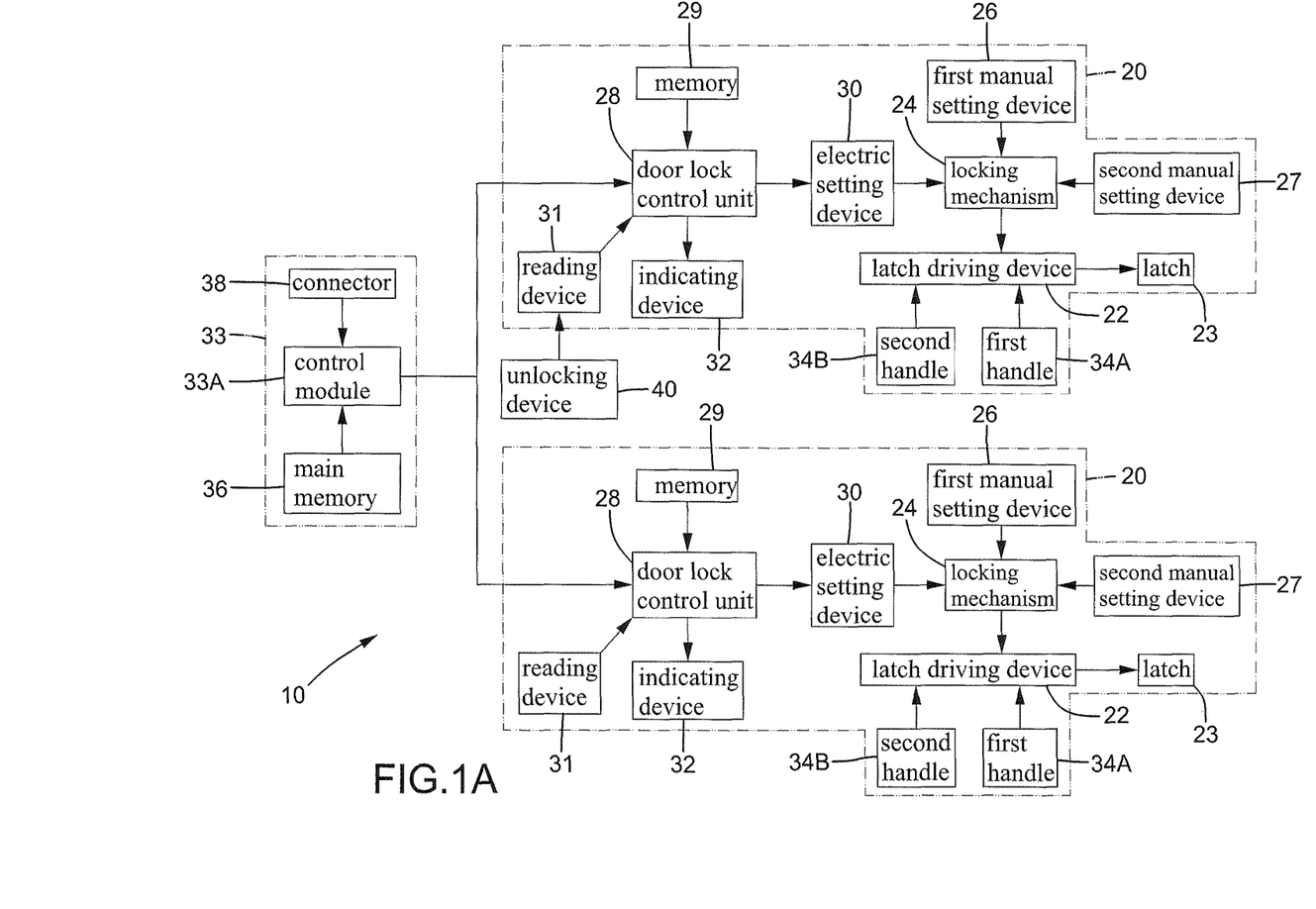
FIG. 1A is a diagrammatic block diagram of the first embodiment with a control device set to be in a forbidding state and with an unlocking device used to set a locking mechanism of a selected door to be in an unlocked state.
Figure 2:
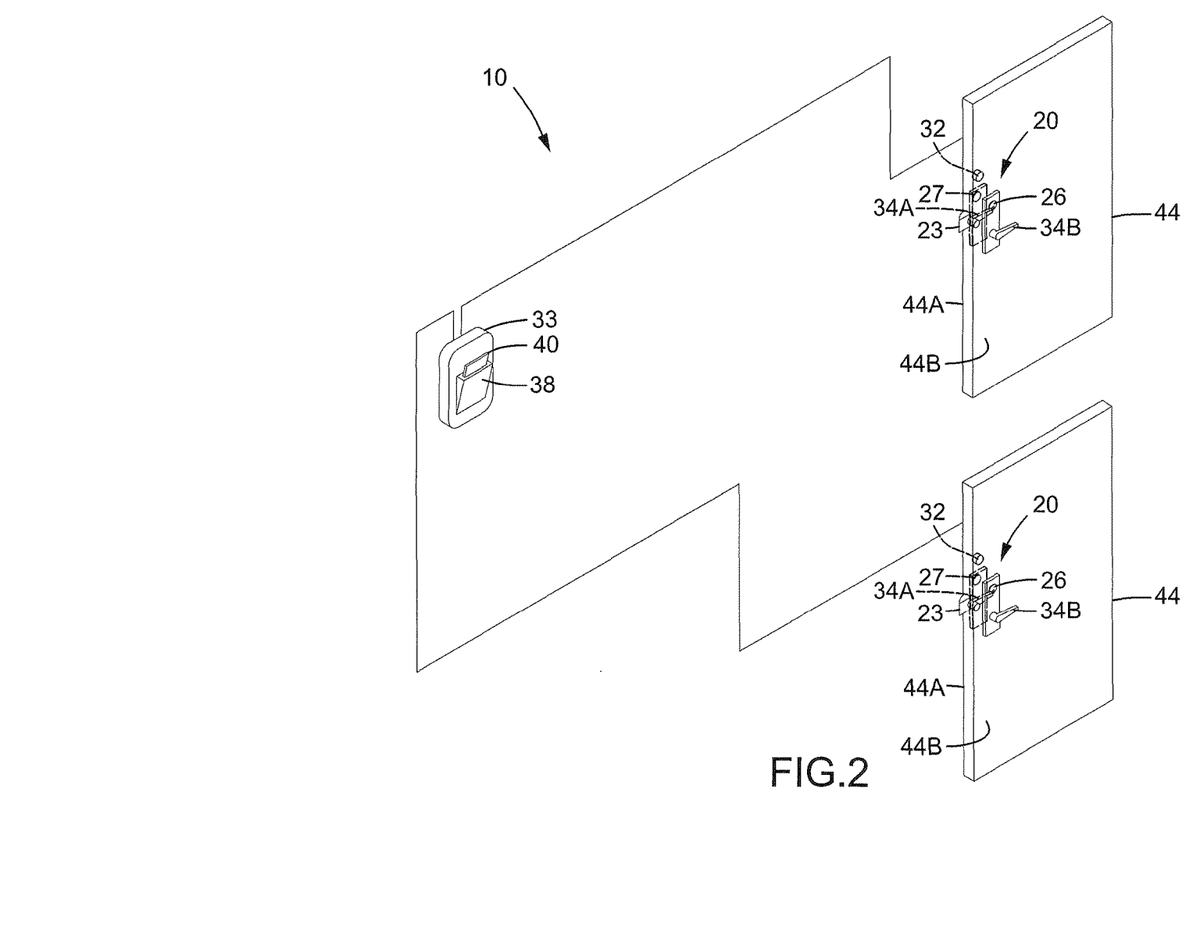
FIG. 2 is a diagrammatic view of the central access control system of the first embodiment.

With reference to FIGS. 1, 1A, and 2, a central access control system 10 of a first embodiment according to the present invention includes a plurality of doors 44. Each door 44 is mounted in a passage to a space, such as a classroom. Each door 44 includes an inner side 44A and an outer side 44B and is movable between a closed position and an open position.

Central access control system 10 further includes a plurality of door locks 20 respectively mounted to doors 44. Each door lock 20 includes a latch driving device 22 and a latch 23 actuatable by the latch driving device 22 to move between a latching position and an unlatching position. Each door lock 20 further includes a locking mechanism 24 for prohibiting operation of latch driving device 22, a first manual setting device 26, a second manual setting device 27, an electric setting device 30, a door lock control unit 28 electrically connected to electric setting device 30, and an indicating device 32 electrically connected to door lock control unit 28. First and second manual setting devices 26 and 27 and electric setting device 30 are configured to set the locking mechanism 24 to be in a locking state or an unlocked state. Each indicating device 32 can include a lighting member capable of generating a green light and a red light and/or a speaker or a buzzer for generating sound. Each indicating device 32 is mounted to inner side 44A of one of doors 44. Each door lock 20 further includes a memory 29 electrically connected to door lock control unit 28 and a reading device 31 electrically connected to door lock control unit 28. Reading device 31 can be a plug-in connector having electrodes.

First manual setting device 26 of each door lock 20 is mounted to outer side 44B of one of doors 44. Second manual setting device 27 is mounted to inner side 44A of one of doors 44. First and second manual setting devices 26 and 27 can be key cylinders of any desired form as conventional including but not limited to of a commercially available type. A key can be used to release the locking state of first manual setting device 26 or second manual setting device 27. Thus, locking mechanism 24 can be set to be in the locking state or the unlocked state.

Each door lock 20 further includes a first handle 34A mounted to outer side 44B of one of the doors 44 and operatively connected to latch driving device 22. Each door dock 20 further includes a second handle 34B mounted to inner side 44A of one of doors 44 and operatively connected to latch driving device 22.

Central access control system 10 further includes a control device 33 having a control module 33A, a main memory 36 electrically connected to control module 33A, and a connector 38 electrically connected to control module 33A. Connector 38 can include an elongated slot receiving electrodes. Control module 33A is electrically connected to door lock control units 28 of door locks 20.

An unlocking device 40 is configured to match with control module 33A to obtain control. In the first embodiment, unlocking device 40 is a door access card and is configured to set control device 33 to be in an enabling state or a forbidding state. An enabling identification information is stored in unlocking device 40. A comparison identification corresponding to unlocking device 40 is stored in memory 29 of each door lock 20.

In operation, unlocking device 40 is inserted into connector 38, and control module 33A reads the enabling identification information and compares the comparison identification information with the enabling identification information. When the comparison identification information matches with the enabling identification information, control module 33A outputs an enabling signal to door lock control units 28 of all of door locks 20, electric setting devices 30 of door locks 20 are not operative under control of door lock control units 28, and locking mechanisms 24 of the door locks 20 in the locking states or the unlocked states remain unchanged. For example, if first manual setting device 26 is used to set locking mechanism 24 to be in the unlocked state, locking mechanism 24 remains in the unlocked state when electric setting device 30 does not operate. On the other hand, if first manual setting device 26 is used to set locking mechanism 24 to be in the locking state, locking mechanism 24 remains in the locking state when electric setting device 30 does not operate. Furthermore, in the case that control device 33 is set to be in the enabling state, indicating device 32 of each door lock 20 generates a green light (in the case of a lighting member) or does not generate sound (in the case of a speaker or a buzzer).

In a case that control device 33 is set to be in the enabling state, that doors 44 are in the closed positions, and that locking mechanism 24 of one of door locks 20 is set to be in the unlocked state, first handle 34A or second handle 34B of the door lock 20 can be operated to actuate latch mechanism 22 of the door lock 20 to move the corresponding latch 23 from the latching position to the unlatching position.

In a case that control device 33 is set to be in the enabling state, that doors 44 are in the closed positions, and that locking mechanism 24 of one of door locks 20 is set to be in the locking state, operation of first handle 34A or second handle 34B of the door lock 20 cannot actuate latch driving device 22 of the door lock 20 for moving the corresponding latch 23 from the latching position to the unlatching position.

If the comparison identification information does not match with the enabling identification information, control module 33A outputs a forbidding signal to door lock control units 28 of all door locks 20. Electric setting devices 30 of door locks 20 set locking mechanisms 24 of door locks 20 to be in the locking states. In this case, when one or more doors 44 are in the closed positions, this door 44 or these doors 44 cannot be moved to the open positions. Furthermore, when control device 33 is set to be in the forbidding state, indicating devices 32 of door locks 20 generate indicating messages to indicate control device 33 is in the forbidding state, such that a user notifying control device 33 in the forbidding state can move originally opened doors 44 from the open positions to the closed positions. Thus, all of doors 44 cannot be moved from the closed positions to the open positions.

In a case that unlocking device 40 is detached from connector 38 of control device 33 and, thus, switches control device 33 from the enabling state to the forbidding state, control module 33A cannot read the enabling identification information, such that control module 33A outputs a forbidding signal to door lock control units 28 of all of door locks 20. Electric setting device 30 of each door lock 20 set locking mechanism 24 of the door lock 20 to be in the locking states, such that latch driving device 22 of the door lock 20 cannot operate, prohibiting operation of first handle 34A or second handle 34B to move latch 23 from the latching position to the unlatching position. In this case, indicating device 32 of each door lock 20 generates an indicating message. If one or more doors 44 are in the closed positions, this door 44 or these doors 44 cannot be moved to the open positions. Furthermore, when one or more doors 44 are in the open positions, the indicating messages generated by indicating devices 32 of all door locks 20 move the originally opened doors 44 to the closed positions. Thus, all doors 44 are in the closed positions and cannot be opened until control device 33 is set to be in the enabling state or until a user uses a key to set a corresponding locking mechanism 24 through first manual setting device 26 or second manual setting device 27.

In a case that unlocking device 40 is inserted into connector 38 and matches with control device 33 to obtain control and sets control device 33 to be in the enabling state after control module 33A identifies that the comparison identification information matches with the enabling identification information, control module 33A outputs an enabling signal to door lock control units 28 of door locks 20 to disable indicating devices 32. However, locking mechanism 24 of each door lock 20 can be set to be in the unlocked state by using a key and through operation of first manual setting device 26 or second manual setting device 27.

In a case that control device 33 is set to be in the forbidding state, unlocking device 40 separate from control device 33 permits a manager holding unlocking device 40 to move near any one of door locks 20. Unlocking device 40 is electrically connected or in electrical induction with reading device 31 of the door lock 20 near unlocking device 40. Door lock control unit 28 of the door lock 20 reads the enabling identification information in unlocking device 40 and compares the enabling identification information with the comparison identification information stored in memory 29. When the enabling identification information matches with the comparison identification information, door lock control unit 28 of the door lock 20 actuates the corresponding electric setting device 30 to set the corresponding locking mechanism 24 to be in the unlocked state, permitting use of first handle 34A to actuate the corresponding latch driving device 22, thereby moving the corresponding latch 23 from the latching position to the unlatching position. On the other hand, when the enabling identification information does not match with the comparison identification information, door lock control unit 28 of the door lock 20 actuates the corresponding electric setting device 30 to set the corresponding locking mechanism 24 to be in the locking state, not permitting use of first handle 34A to actuate the corresponding latch driving device 22 for moving the corresponding latch 23 from the latching position to the unlatching position.

Figure 3:
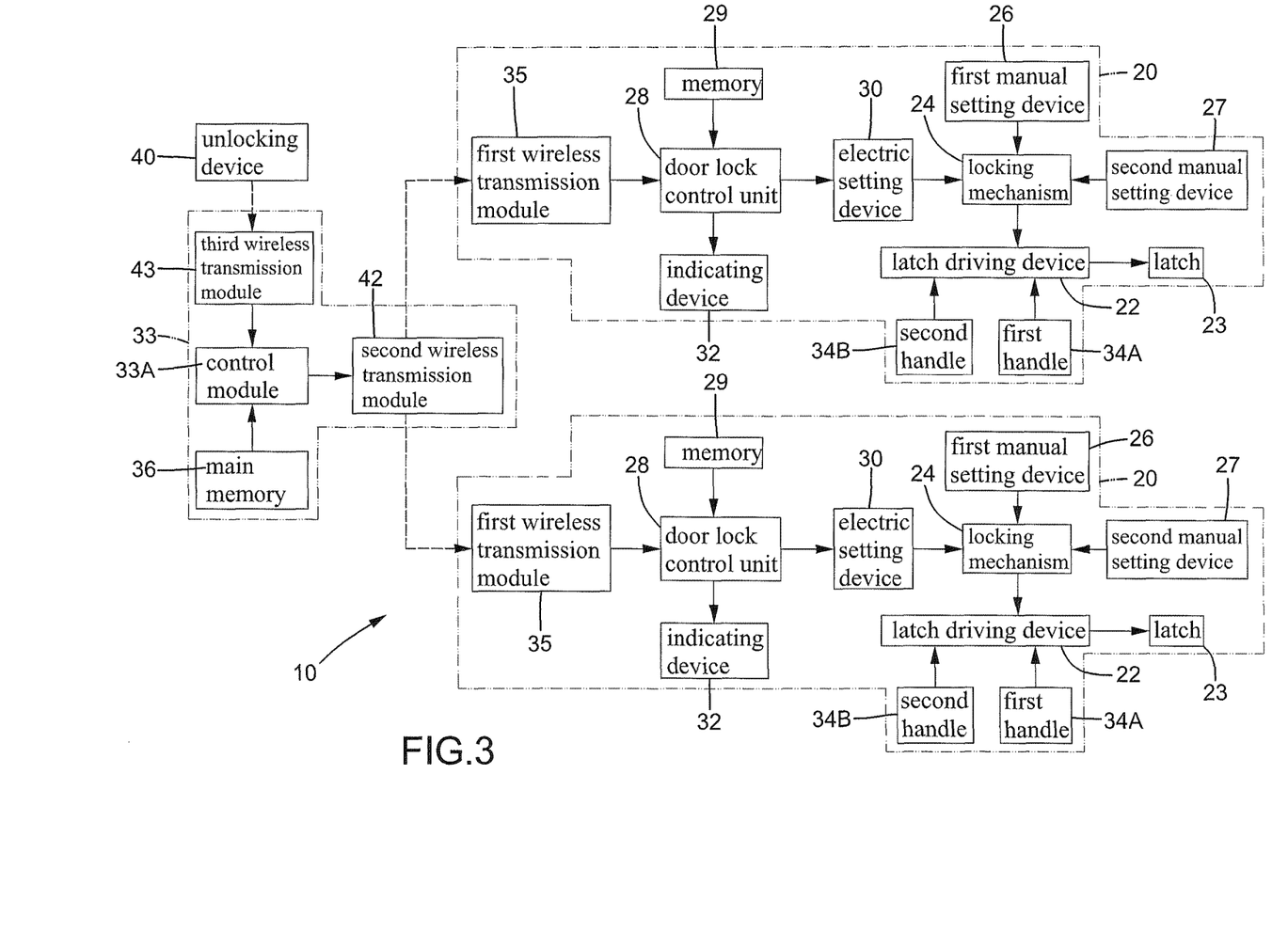
FIG. 3 is a diagrammatic block diagram of a central access control system of a second embodiment according to the present invention.
Figure 3A:
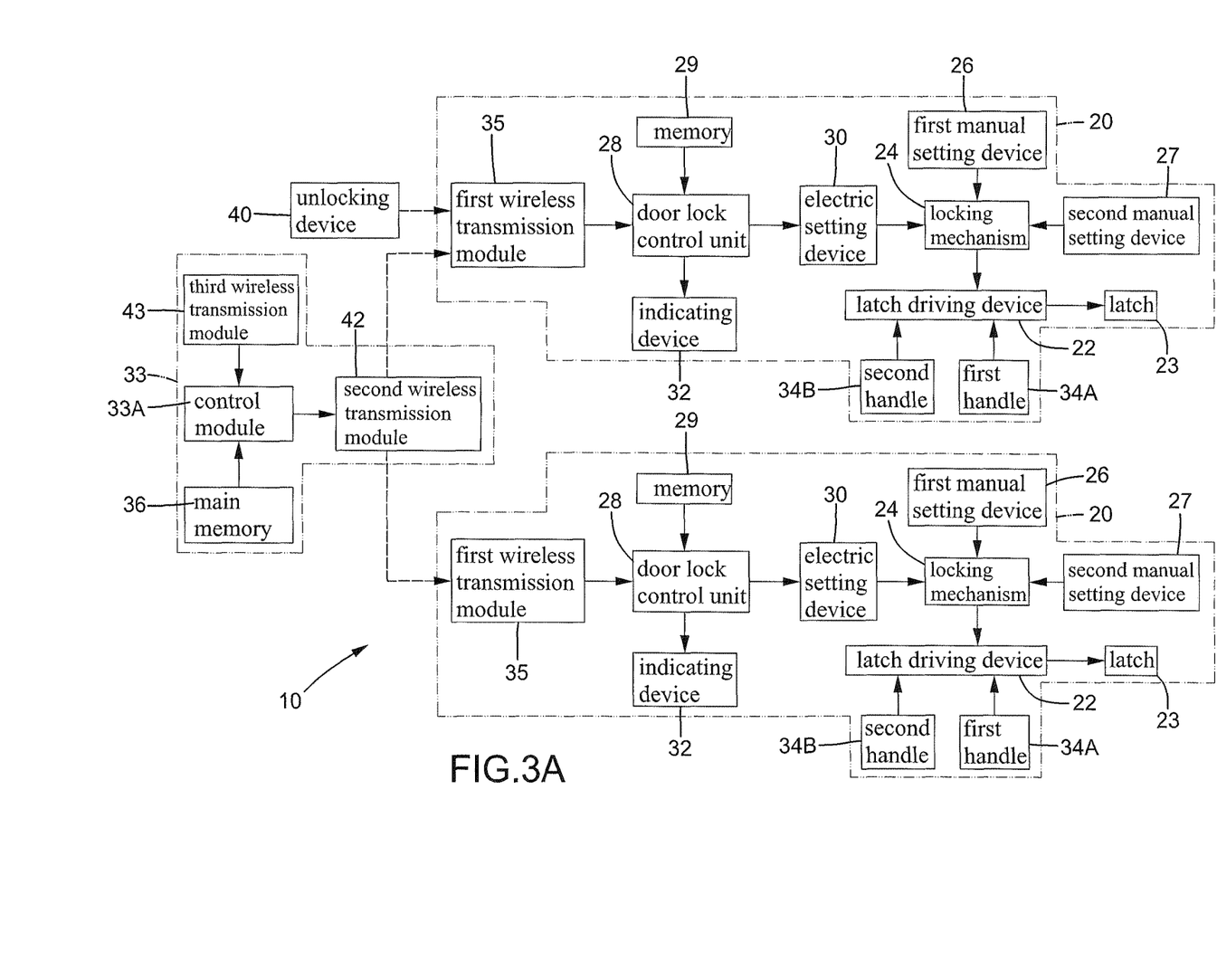
FIG. 3A is a diagrammatic block diagram of the second embodiment with a control device set to be in a forbidding state and with an unlocking device used to set a locking mechanism of a selected door to be in an unlocked state.
Figure 4:
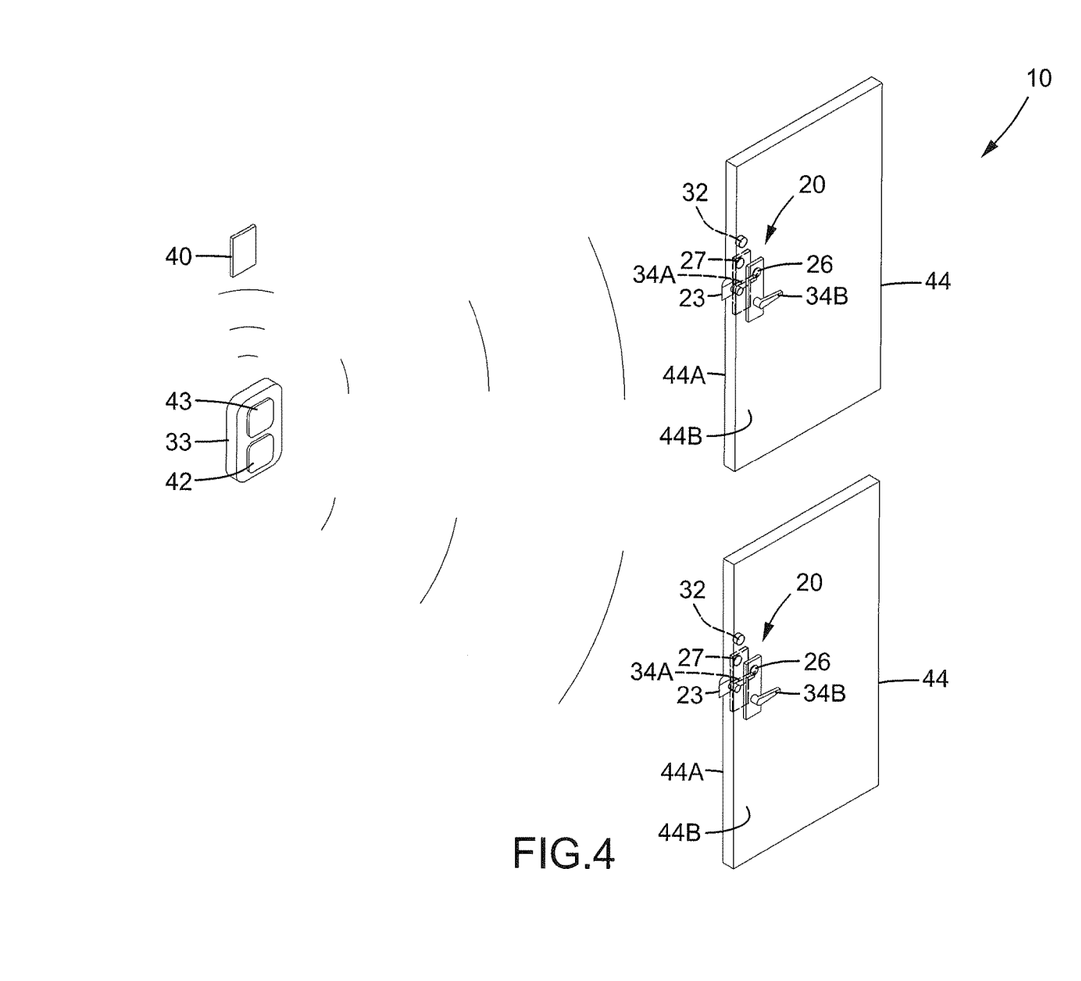
FIG. 4 is a diagrammatic view of the central access control system of the second embodiment using a door access card.

FIGS. 3, 3A, and 4 show a central access control system 10 of a second embodiment according to the present invention. In the second embodiment, each door lock 20 further includes a first wireless transmission module 35 electrically connected to door lock control unit 28 thereof. Control device 33 does not include connector 38 but includes a second wireless transmission module 42 electrically connected to control module 33A. Control device 33 further includes a third wireless transmission module 43 electrically connected to control module 33A to replace connector 38 in the first embodiment. Thus, unlocking device 40 can be any equipment (such as a door access card or any equipment other than the door access card) of the manager, such as a mobile phone, a tablet computer, a personal computer, or a remote control of the manager, permitting remote communication with third wireless transmission module 43. Furthermore, first wireless transmission module 35 of each door lock 20 is connected to second wireless transmission module 42 of control device 33, such that electric wires are not required between control device 33 and door locks 20. The forbidding signal or the enabling signal of the control device 33 can be transmitted through second wireless transmission module 42 to first wireless transmission modules 35 of door locks 20.

In a case that unlocking device 40 is a door access card (see FIG. 4) and is in a communication range of third wireless transmission module 43, control device 33 is set to be in the enabling state. On the other hand, control device 33 is set to be in the forbidding state when the door access card is outside the communication range of third wireless transmission module 43. When control device 33 is in the forbidding state and the door access card is close to a door lock 20 of a door 44 to be opened, first wireless transmission module 35 of the door lock 20 reads the enabling identification information, and door lock control unit 28 of the door lock 20 compares the enabling identification information with the comparison identification information in memory 29. When the enabling identification information does not match with the comparison identification information, locking mechanism 24 of the door lock 20 remains in the original state (the locking state or the unlocked state). On the other hand, when the enabling identification information matches with the comparison identification information, locking mechanism 24 of the door lock 20 is set by electric setting device 30 to be in the unlocked state, permitting the user of the door access card to move the door 44 from the closed position to the open position.

In another case that unlocking device 40 is a mobile phone of the manager (see FIG. 5), each door lock 20 includes a specific hardware identification information stored in memory 29 thereof. The specific hardware identification information of all of door locks 20 is stored in main memory 36 of control device 33. Control device 33 can be connected to and operated by the mobile phone of the manager via a management program and third wireless transmission module 43. Namely, when control device 33 is set to be in the enabling state, the mobile phone of the manager can use the management program to send a specified forbidding signal via control device 33 to selected one or more of door locks 20. Specifically, when the mobile phone of the manager is connected to control device 33 and executes the management program, the mobile phone of the manager obtains the hardware identification information of door locks 20 stored in main memory 36 of control module 33A. Thus, the manager is permitted to select one or more of door locks 20 and sends a forbidding signal to the selected one or more door locks 20. The forbidding signal includes the hardware identification information of the selected one or more door locks 20. Furthermore, the forbidding signal will be received by all of door locks 20. Each door lock 20 compares the hardware identification information contained in the forbidding signal with the hardware identification information stored in memory 29 thereof. When a door lock 20 identifies that the hardware identification information contained in the forbidding signal does not match with the hardware identification information stored in memory 29 thereof, this door lock 20 will not actuate electric setting device 30, and locking mechanism 24 will remain in its original state. When a door lock 20 (namely, any one of the selected one or more door locks 20) identifies that the hardware identification information contained in the forbidding signal matches with the hardware identification information stored in memory 29 thereof, this door lock 20 will actuate electric setting device 30 to set locking mechanism 24 to be in the locking state, and movement of the corresponding door 44 from the closed position to the open position is not permitted.

Figure 5:
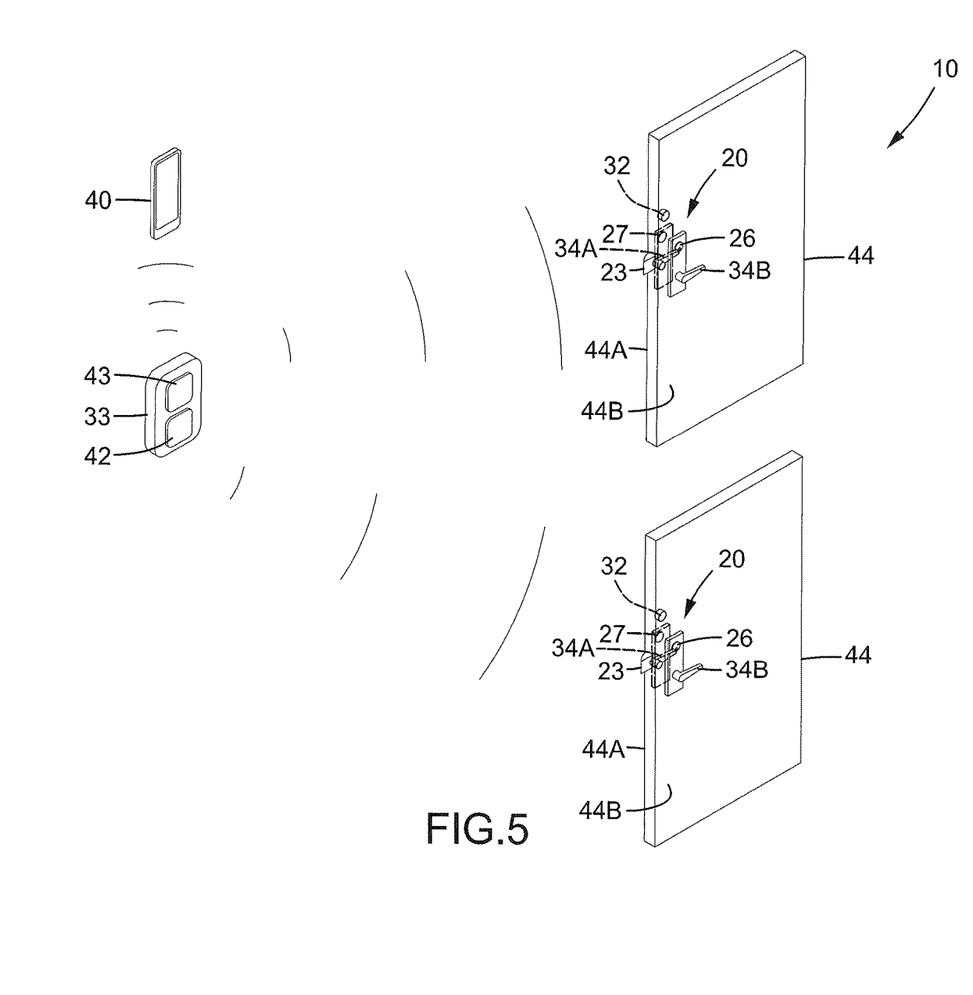
FIG. 5 is a diagrammatic view of the central access control system of the second embodiment using a mobile device.

Furthermore, the mobile phone of the manager can execute the management program to set control device 33 to be in the forbidding state or the enabling state. In a case that control device 33 is set by the mobile phone of the manager to be in the enabling state, control device 33 sends out an enabling signal not containing the hardware identification information of any door lock 20, such that all of door locks 20 execute the enabling signal without actuating electric setting devices 30 to change the state of locking mechanisms 24. In another case that control device 33 is set by the mobile phone of the manager to be in the forbidding state, control device 33 sends out a forbidding signal not containing the hardware identification information of any lock core 20, such that all door locks 20 execute the forbidding signal to actuating electric setting devices 30 to change the state of locking mechanisms 24. Thus, latch 23 of each door lock 20 will not be permitted to move from the latching position to the unlatching position. Furthermore, if control device 33 identifies that the enabling identification information of the mobile phone of the manager does not match with the comparison identification information of main memory 36, control device 33 is set to be in the forbidding state and does not permit operation by the mobile phone (i.e., unlocking device 40).

Central access control system 10 can be applied in a school or any other suitable place to provide better safety protection. In an example, central access control system 10 is used in a school, indicating device 32 of each door lock 20 is a buzzer or a speaker, and control device 33 can be mounted in the principal office or the security room of the school. When control device 33 is set to be in the enabling state, indicating devices 32 of all door locks 20 do not operate. In a case that an intruder breaks into the school, the principal or a guard can use unlocking device 40 to rapidly set control device 33 to be in the forbidding state, such that indicating device 32 of each door lock 20 generates warning sounds. If one or more doors 44 are in the closed positions, each of the one or more closed doors 44 is set to be in the locking state due to locking mechanism 24 thereof. If one or more doors 44 are in the open positions, the user will be reminded by indicating device 32 of each of the one or more opened doors 44 and can move each of the one or more opened doors 44 from the open position to the closed position. Thus, all doors 44 can be moved to the closed positions when control device 33 is set to be in the forbidding state. Since locking mechanism 24 of each door lock 20 is set to be in the locking state, operation of the first handle 34A or the second handle 34B of each door 44 in the closed position for actuating the corresponding latch driving device 22 for moving latch 23 from the latching position to the unlatching position is prevented. Thus, all doors 44 remain in the closed positions, delaying the intrusion into the classrooms and/or rooms in the school by the intruder and increasing security effect.

In another example, central access control system 10 is applied in a large company or a large facility having a plurality of rooms. Indicating devices 32 of doors 44 mounted to the rooms are lighting members. Each indicating device 32 generates a green light when control device 33 sends out an enabling signal. Each indicating device 32 generates a red light when control device 33 sends out a forbidding signal. After office hours, workers in some rooms could work overtime while other workers in other rooms have gotten off duty. The other rooms could be left unlocked due to neglect. To make sure door 44 of each room is locked, unlocking device 40 can be used to set control device 33 to be in the forbidding state. Thus, indicating device 32 of each door lock 20 generates a red light. Since locking mechanisms 24 of the doors 44 (which are not locked due to neglect and which are in the closed positions) are set in the locking states, each door 44 cannot be opened by directly operating first handle 34A or second handle 34B. Although the workers working overtime will be locked too, these workers can use a key to operate first manual setting device 26 or second manual setting device 27 to set the corresponding locking mechanism 24 into the unlocked state while control device 33 remains in the forbidding state. Thus, first handle 34A or second handle 34B can be used to actuate latch driving device 22 to move latch 23 from the latching position to the unlatching position, permitting the corresponding door 44 to be moved from the closed position to the open position.

When used in a school, central access control system 10 can be used to rapidly and uniformly lock all doors 44 of the classrooms, effectively delaying the intrusion into the classrooms by the intruder, thereby increasing school security.

When used in a company, central access control system 10 can be used to rapidly lock all doors 44 after office hours at one time. Thus, it is not necessary to send a person to check whether each door 44 has been locked.

Central access control system 10 uses a single control device 33 set in the forbidding state to rapidly lock all door locks 20 and permits use of a key to release the locking state of a corresponding door lock 20 through first manual setting device 26 or second manual setting device 27 while control device 33 is in the forbidding state, providing convenience and utility.

In the second embodiment, central access control system 10 uses wireless transmission, such that control device 33 can be connected to all door locks 20 at the same time without the problems and disadvantages of electric wires. Furthermore, central access control system 10 is connected to unlocking device 40 via wireless transmission, such that unlocking device 40 is not limited to a conventional door access card. Namely, unlocking device 40 can be a mobile phone, a personal computer, or a remote control, which can be used to set control device 33 to be in the enabling state or the forbidding state after matching with control device 33.

Now that the basic teachings of the present invention have been explained, many extensions and variations will be obvious to one having ordinary skill in the art. For example, one or more door locks 20 do not have to include second manual setting device 27. In this case, the one or more door locks 20 can be of a type having an unlockable inner handle, such that when the corresponding locking mechanism 24 is set to be in the locking state, operation of first handle 34A to actuate latch driving device 22 for moving latch 23 from the latching position to the unlatching position is not permitted, but operation of second handle 34B to actuate latch driving device 22 for moving latch 23 from the latching position to the unlatching position is permitted. Thus, central access control system 10 still can rapidly lock a plurality of door locks 20 at the same time in an emergency condition.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A central access control system comprising:

a plurality of doors, with each of the plurality of doors movable between a closed position and an open position;

a plurality of door locks respectively mounted to the plurality of doors, with each of the plurality of door locks including a latch driving device and a latch actuatable by the latch driving device to move between a latching position and an unlatching position, with each of the plurality of door locks further including a locking mechanism for prohibiting operation of the latch driving device, a first manual setting device, an electric setting device, and a door lock control unit electrically connected to the electric setting device, with the first manual setting device and the electric setting device configured to set the locking mechanism into a locking state or an unlocked state;

a control device including a control module electrically connected to the door lock control units of the plurality of door locks, with the control module configured to simultaneously move the latches of the plurality of door locks into the latching position; and an unlocking device physically removably coupled to the control device and configured to match with the control module of the control device to obtain control, with the unlocking device configured to set the control device to be in an enabling state or a forbidding state, with one of the plurality of doors in the closed position and the latch of a corresponding one of the plurality of door locks in the latching position, the one of the plurality of doors is not permitted to move from the closed position to the open position, with one of the plurality of doors in the closed position and the latch of a corresponding one of the plurality of door locks in the unlatching position, the one of the plurality of doors is permitted to move from the closed position to the open position, with the locking mechanism of one of the plurality of door locks set by the first manual setting device or the electric setting device to be in the locking state, the latch driving device of the one of the plurality of door locks is not permitted to drive the latch of the one of the plurality of door locks from the latching position to the unlatching position, with the locking mechanism of one of the plurality of door locks set by the first manual setting device or the electric setting device to be in the unlocked state, the latch driving device of the one of the plurality of door locks is permitted to drive the latch of the one of the plurality of door locks from the latching position to the unlatching position, with the unlocking device physically coupled to the control device, the control device is set by the unlocking device to be in the enabling state, the control module outputs an enabling signal to the door lock control units of the plurality of door locks, the electric setting devices of the plurality of door locks are not operative, and the locking mechanism of each of the plurality of door locks in the unlocking state or the locked state remains unchanged, and with the unlocking device physically removed from the control device, the control device is set by the unlocking device to be in the forbidding state, the control module outputs a forbidding signal to the door lock control units of the plurality of door locks, the electric setting devices of the plurality of door locks set the locking mechanisms of the plurality of door locks to be in the locked states, and the plurality of door locks is locked simultaneously, with the control device further including:

a connector electrically connected to the control module, wherein the connector is integrally formed with the control module and includes a groove, wherein the unlocking device is physically removably inserted into the groove of the connector; and a main memory electrically connected to the control module, with the main memory configured to store a first identification information, with the unlocking device inserted into the groove to be physically and electrically connected to the connector, the control module reads a second identification information in the unlocking device, wherein the control device is set to be in the enabling state when the first identification information matches with the second identification information, and wherein the control device is set to be in the forbidding state when the first identification information does not match with the second identification information, and with the unlocking device physically removed from the groove to be electrically disconnected from the connector, the control device is set to be in the forbidding state to simultaneously lock the plurality of door locks.

2. The central access control system as claimed in claim 1, with each of the plurality of doors including an inner side and an outer side, with each of the plurality of door locks further including an indicating device electrically connected to one of the door lock control units and mounted to the inner side of one of the plurality of doors, with each indicating device generating at least one of light and sound to indicate the control device is in the enabling state or the forbidding state.

3. The central access control system as claimed in claim 1, with each of the plurality of doors including an inner side and an outer side, with the first manual setting device of each of the plurality of door locks mounted to the outer side of one of the plurality of doors, with each of the plurality of door locks further including:

a second manual setting device mounted to the inner side of one of the plurality of doors, with the second manual setting device configured to set the locking mechanism to be in the locking state or the unlocked state;

a first handle mounted to the outer side of one of the plurality of doors and operatively connected to the latch driving device; and a second handle mounted to the inner side of one of the plurality of doors and operatively connected to the latch driving device, with the locking mechanism set in the locking state, the second manual setting device is permitted to set the locking mechanism to be in the unlocked state, permitting use of the first handle and the second handle to actuate the latch driving device to drive the latch from the latching position to the unlatching position.

4. The central access control system as claimed in claim 1, with each of the plurality of door locks further including a memory electrically connected to the door lock control unit and a reading device electrically connected to the door lock control unit, with a comparison identification information stored in the memory, and with an enabling identification information stored in the unlocking device, with the control device set to be in the forbidding state and when the unlocking device is located adjacent to one of the plurality of door locks, the reading device of the one of the plurality of door locks reads the enabling identification information stored in the unlocking device, wherein when the comparison identification information in the memory matches with the enabling identification information in the unlocking device, the door lock control unit actuates the electric setting device to set the locking mechanism to be in the unlocked state, and wherein when the comparison identification information in the memory does not match with the enabling identification information in the unlocking device, the door lock control unit actuates the electric setting device to set the locking mechanism to be in the locking state.

* * * * *